March 7, 1961

L. H. MORIN 2,973,556

TRAVELER AND METHOD OF PRODUCING THE SAME
WITH PRE-SHAPED CAST INSERT

Filed Oct. 8, 1957

INVENTOR
LOUIS H. MORIN
BY
Howard E. Thompson
ATTORNEY 2,973,556
Patented Mar. 7, 1961

2,973,556
TRAVELER AND METHOD OF PRODUCING THE SAME WITH PRE-SHAPED CAST INSERT
Louis H. Morin, Bronx, N.Y., assignor to Coats & Clark Inc., New York, N.Y., a corporation of Delaware
Filed Oct. 8, 1957, Ser. No. 688,860
8 Claims. (Cl. 18—30)

This invention relates to travelers employing inserts joining and bridging spaced molded plastic portions of the traveler. More particularly, the invention deals with a traveler of the character described, wherein the inserts are pre-formed or pre-shaped as members. Still more particularly, the invention deals with a method of producing travelers of the character described.

The novel features of the invention will be best understood from the following description, when taken together with the accompanying drawing, in which the separate parts are designated by suitable reference characters in each of the views and, in which.

Figure 3:
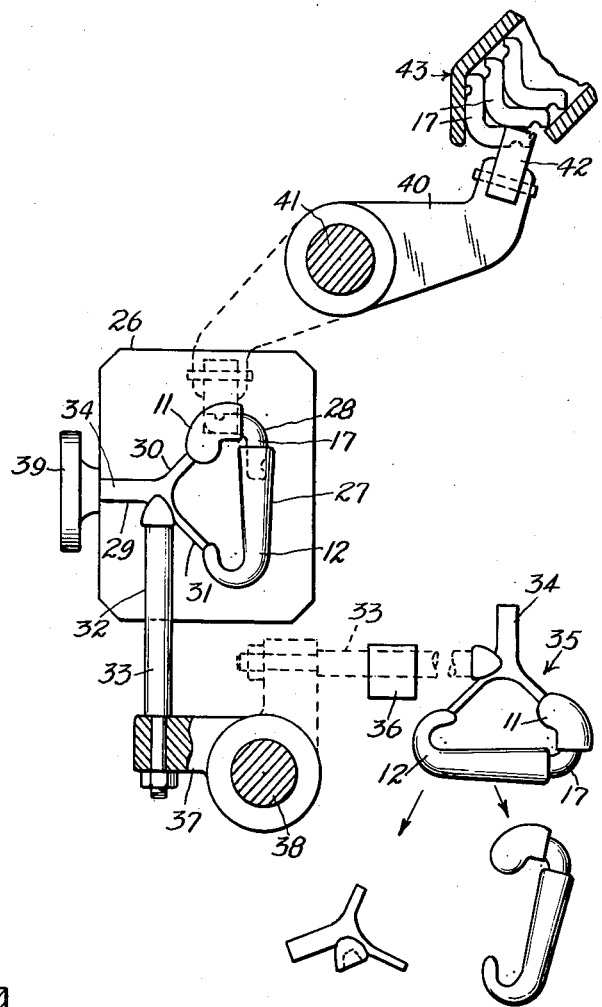
Figure 4:
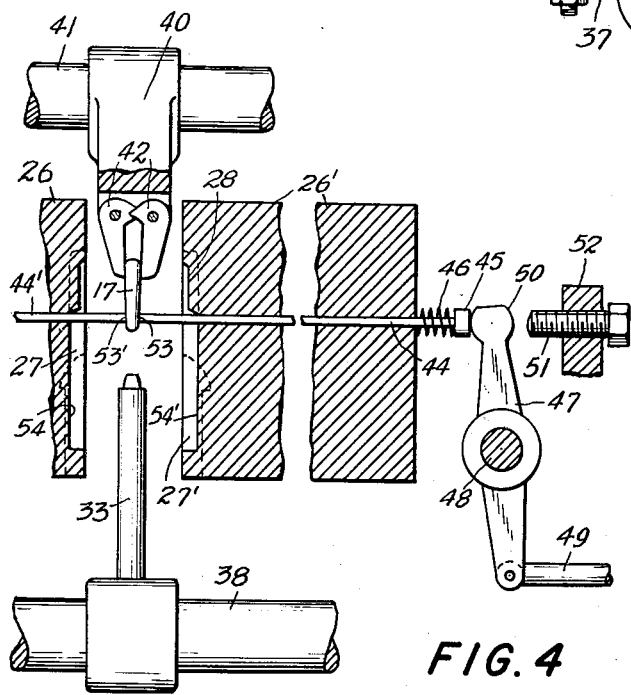

Fig. 3 is a diagrammatic illustration of part of the mechanism for forming molded plastic portions on an insert positioned between a pair of dies, indicating part of the structure in different positions in dotted lines and diagrammatically illustrating the result of a trimming operation; and Fig. 4 is a diagrammatic cross-sectional view through the dies, indicating part of the insert gripping and positioning mechanism for support of the insert between the dies when in open position.

Figure 1:
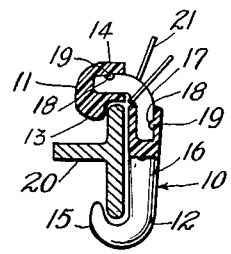
Fig. 1 is a detail side and sectional view of a traveler made according to my invention shown on a sectional portion of a traveler ring and diagrammatically showing the contact of a thread with the insert of the traveler.

In Fig. 1 of the drawing, I have shown in plan and in section one form of traveler 10 made according to my invention. The traveler 10 comprises two plastic molded portions 11 and 12 which, by virtue of their structure, may be said to define hook ends of the traveler. The part 11 has an offset hook portion 13 and a short shank 14, whereas, the part 12 has a hook portion 15 and a long shank 16. The shanks of the parts 10 and 11 are bridged and spaced by an insert 17 which, in the construction shown, in generally L-shaped in form; the insert can be formed by casting or otherwise from numerous materials suitable to present a hard wearing surface on the resulting product. Such materials as ceramics, especially shaped synthetic Sapphire or other materials such as Carboloy, Kentanium and the like can be used.

The inserts 17 are formed with recesses 18 at one side of end portions thereof, the recesses being shown at the outer sides in the present construction. These recesses form anchorage or key portions 19 seating in the recesses as and when the molded plastic members 10 and 11 are formed upon end portions of the insert in accordance with the method later described. For purposes of illustration, I have shown, at 20 in Fig. 1, part of a traveler ring to diagrammatically illustrate arrangement of the traveler thereon and, at 21, I have shown part of a thread engaging that part of the insert 17 bridging the ends of the shanks 14 and 16.

Figure 2:
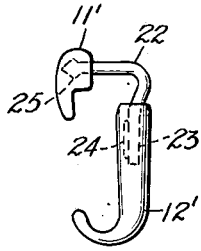
Fig. 2 is a side view of a modified form of traveler which I employ.

In Fig. 2 of the drawing, I have shown a slight modification, wherein an insert 22, generally of the contour of the insert 17, is employed, except that one end 23 fitting in a part 12', generally similar to the part 12, has a long protruding key portion 24 retaining the end 23 against movement in and displacement from the part 12'. The other end of the insert 24 has an enlarged diamond-shaped head or key portion 25 which secure-ly anchors the other part 11' thereto, the part 11' being generally similar to the part 11. It will also be apparent that, in Fig. 2, the parts 12', 11' are spaced farther apart than with the structure shown in Fig. 1. This spacing can be varied to suit different uses.

In Figs. 3 and 4 of the drawing, I have diagrammatically shown the method of producing end products such, for example, as illustrated in Figs. 1 and 2. In Fig. 3, the product illustrated in Fig. 1 of the drawing is shown.

In Fig. 3, I have shown, at 26, a face view of one die, the companion die being illustrated at 26' in Fig. 4 of the drawing. Adjacent surfaces of these dies have cavities 27, 27' for molding the parts 11 and 12 and a cavity portion 28, note Fig. 3, for reception of part of the insert 17. The surfaces of the dies also have sprue or gate passages 29 extending to branches 30, 31, as clearly noted in Fig. 3, for molding of the separate parts 11 and 12 of the resulting end product. The dies also have cavities 32 for reception of a transfer pin 33, upon which the gate portions 34 are molded, so that the formed product can be moved to a trimming station, generally identified by the arrow 35, in Fig. 3, where the gate 34 can be trimmed from the end product, as diagrammatically illustrated in Fig. 3, the gate being stripped from the pin 33 by a stripping tool 36 in returning the pin from the dotted line position of Fig. 3 to its operative position between the dies, as shown in full lines in said figure.

The pin 33 is mounted on an arm 37 actuated through a reciprocating shaft 38, which is timely actuated to move the pin 33 and to retain the same in the two positions diagrammatically illustrated for the period of time necessary to form the molded parts 11 and 12 and to trim the product to remove the gate 34.

At 39 is diagrammatically shown part of the injection nozzle of an injection molding machine, through which heated plastic material can be injected into the cavities 27, 27' in forming the parts 11 and 12 on end portions of the insert 17. Any suitable plastics can be used in forming the parts 11 and 12 and nylon would be illustrative of one type of plastics which can be used.

In carrying out my method, I provide an intermittently reciprocating arm 40 arranged upon a shaft 41. The free end of the arm pivotally supports a pair of grippers 42, which are diagrammatically shown, these grippers being intermittently actuated by air to move the same into operative or gripping position. However, the means for actuating the grippers is not shown, as structures of this type and kind are well known in the art.

The grippers are timely operated to grip the lowermost insert 17 of a hopper, diagrammatically shown in part at 43 in Fig. 3 of the drawing, this hopper constituting a supply station. The arm 40 is then moved into the dotted position of Fig. 3, or the full line position of Fig. 4 to locate the insert in position between the dies 26, 26'.

When the insert 17 is positioned, as seen in Fig. 4, a pair of gripper rods 44, 44' are moved into operative engagement with the insert 17; whereupon, the grippers 42 are released from the insert and the arm 40 is swung from the dotted line position of Fig. 3 back to the full line position to engage the next successive insert.

As both rod units 44, 44' are of similar construction, the brief description of one, namely the rod 44 only, will be given. The rod 44 has, at its outer end, an enlarged head 45, between which and the surface of the die is arranged a spring 46 which tends to normally urge the rod outwardly. At 47 I have shown a lever arranged upon a shaft 48 and actuated through an operating rod, shown in part at 49 in movement of the enlarged end portion 50 of the lever into the position shown in Fig. 4 or, in other words, the gripper position of the rod 44.

In alinement with the rod 44 and spaced with respect thereto is an adjustable stop screw 51 arranged in a suitable support 52 and this screw limits outward movement of the end 50 of the lever 47 and corresponding outward movement of the rod 44 by the spring 46 so that the inner end surfaces 53, 53' of the rods can be terminated in alinement with the surfaces 54', 54 of the cavities 27', 27, respectively, when the dies 26, 26' are in closed position upon the insert 17.

It will be understood that the gripper rods 44, 44' support the insert 17 in proper position between the die cavities 27, 27' and, particularly, the cavity 28, until the dies are fully closed upon the insert, so that the insert is retained in proper position within the die cavities; whereupon, the levers 47 are actuated to permit the gripper rods 44, 44' to recede to their normal open position and with the surfaces, mentioned above, in alinement.

It will be understood that, when the dies are closed, the transfer pin 33 has been positioned within and between the dies, as is illustrated in Figs. 3 and 4 of the drawing.

With my improved method as described above, it will be apparent that, while the parts 11 and 12 are being formed on an insert positioned between the dies, the next successive insert is being picked up, preparatory to delivery in a position between the dies as and when the pin 33 has moved the cast or molded parts to the trimming station 35, as indicated partially in dotted lines in Fig. 3 of the drawing and, immediately upon performing the trimming operation and the stripping of the gate 34 from the pin, the pin 33 is returned to its position between the dies and these operations are repeated in the successive operations of the machine.

Having fully described my invention, what I claim as new and desire to secure by Letters Patent is:

1. The herein described method of producing travelers of the character described, which comprises actuating means for intermittently picking up an insert having offset end portions from a supply station and positioning the same in registering alinement with mold cavities of a pair of open dies, then actuating a pair of gripper rods to engage and support the insert as positioned between the open dies, then releasing the first named means from the insert and moving the same from position between the dies, positioning a transfer pin between the open dies, then closing the dies upon the insert supported by said rods, then retracting the rods to bring adjacent surfaces thereof in alinement with walls of the die cavities, then pressure injecting plastic material into the closed dies to form molded plastic bodies on the end portions of said insert and a gate portion on said transfer pin, then separating the dies and actuating the transfer pin to deliver the product thus formed to a trimming station, then trimming the product to remove the gate portion, and ejecting the gate portion from said pin.

2. In a die casting machine for the production of cast objects having a pair of dies movable between an open position and a casting position, said dies having adjacent surfaces and cavities in the adjacent surfaces, the combination comprising a gripper rod in each die movable relative thereto and having an inner end adapted to extend into the cavity thereof, the inner ends and the cavities conforming to the shape of the desired cast object when each is in a casting position and the cavities having cavity portions to support the insert when in the casting position, delivery means movable into a first position between the adjacent surfaces when the dies are in the open position and into a second position clear of the adjacent surfaces when the dies are in the casting position for moving the insert from a supply station to a desired position between the adjacent surfaces, gripper actuating means to advance the inner ends of the gripper rods into supporting contact with the insert while the insert is held between the adjacent surfaces by the delivery means and to hold the inner ends in said supporting contact while the dies move from the open position to the casting position, and retraction means to retract the inner ends of the gripper rods from contact with the insert into the casting position leaving the inserts supported by the cavity portions.

3. In a die casting machine for the production of cast objects having preformed inserts cast integral therewith having a pair of dies movable between an open position and a casting position, the combination of die cavity means in the dies for completely surrounding the insert when the dies are in casting position so that no part of the insert extends beyond the die cavity means, and gripper means movable relative to the dies when the latter are in the casting position and extending into the die cavities to support an insert between the cavieties while the dies move from the open position to the casting position.

4. In a die casting machine for the production of cast objects having preformed inserts cast integral therewith, said machine having a plurality of die surfaces each movable between an open position and a casting position, said surfaces defining, when in casting position, the shapes of the desired cast objects and completely surrounding the insert when in casting position, the combination comprising delivery means to position the insert between the die surfaces in open position, actuating means to advance a gripping portion of the die surfaces into supporting contact with the insert held by the delivery means with the dies in the open position, cavity portions on the die surfaces to support the insert when the die surfaces are in casting position and retraction means to retract the gripping portion of the die surfaces from contact with the insert when the insert is supported by the cavity portions.

5. In a casting machine for the production of cast objects having preformed inserts cast integral therewith, said machine having a pair of dies movable along a straight path between an open position and a casting position, the combination comprising adjacent surfaces on the dies, cavities in the adjacent surfaces defining the shape of the object to be cast when the dies are in the casting positions, a gripper rod in each die movable relative to the die, said gripper rods having a common axis parallel to the straight path, and inner ends of the gripper rods extending into the cavities to support the insert during the closing of the dies.

6. A die casting machine as described in claim 2 wherein the insert at no point extends beyond the cavities when the cavities are in a casting position.

7. A die casting machine as described in claim 3 wherein the cavities are provided with cavity portions adapted to support the insert within the die cavities when the dies are closed.

8. A die casting machine as described in claim 3 wherein the cavities are provided with cavity portions adapted to support the insert within the die cavities when the dies are closed and with retraction means adapted to retract the gripper means from contact with the insert after the dies are closed and after the insert is supported by the cavity portions.

References Cited in the file of this patent

UNITED STATES PATENTS

| | | |
|---|---|---|
| 2,203,694 | Morin et al. | June 11, 1940 |
| 2,453,739 | Bates | Nov. 16, 1948 |
| 2,506,966 | Morin et al. | May 9, 1950 |
| 2,572,140 | Haley | Oct. 23, 1951 |
| 2,579,952 | Morin | Dec. 25, 1951 |
| 2,580,816 | Morin | Jan. 1, 1952 |
| 2,643,418 | Auldridge | June 30, 1953 |
| 2,683,346 | Pieper | July 13, 1954 |
| 2,718,668 | Burke | Sept. 27, 1955 |
| 2,749,698 | Stahli | June 12, 1956 |